US012621156B2

(12) United States Patent 
Cohoon

(10) Patent No.: US 12,621,156 B2 
(45) Date of Patent: *May 5, 2026

(54) PREVENTING UNAUTHORIZED RESOURCE ACCESS RELATED TO A COMPROMISED TOKEN

(71) Applicant: Truist Bank, Charlotte, NC (US)

(72) Inventor: Jason B. Cohoon, Sparta, TN (US)

(73) Assignee: Truist Bank, Charlotte, NC (US)

( * ) Notice: Subject to any disclaimer, the term of this patent is extended or adjusted under 35 U.S.C. 154(b) by 72 days.

This patent is subject to a terminal disclaimer.

(21) Appl. No.: 18/636,889

(22) Filed: Apr. 16, 2024

(65) Prior Publication Data

US 2025/0323790 A1     Oct. 16, 2025

(51) Int. Cl.
*H04L 9/32* (2006.01)
*G06F 21/10* (2013.01)
*G06F 21/62* (2013.01)

(52) U.S. Cl.
CPC ........ *H04L 9/3213* (2013.01); *G06F 21/1014* (2023.08); *G06F 21/62* (2013.01)

(58) Field of Classification Search
CPC ..... G06F 21/1014; G06F 21/62; H04L 9/3213
See application file for complete search history.

(56) References Cited

U.S. PATENT DOCUMENTS 10,423,777 B2 * 9/2019 Spisak ................... G06F 9/3004
12,126,546 B1 * 10/2024 De Castro Marchese ...................
H04L 47/822

| | | | |
|---|---|---|---|
| 2011/0041167 A1 * | 2/2011 | Nguyen ................ | H04L 63/062 |
| | | | 726/6 |
| 2013/0047200 A1 * | 2/2013 | Radhakrishnan ....... | G06F 21/34 |
| | | | 726/1 |
| 2014/0230020 A1 * | 8/2014 | Mogaki ................. | H04L 9/3213 |
| | | | 726/4 |
| 2015/0312038 A1 * | 10/2015 | Palanisamy .......... | G06Q 20/385 |
| | | | 713/155 |
| 2018/0300717 A1 * | 10/2018 | Haque ................... | H04L 9/3213 |
| 2019/0036700 A1 * | 1/2019 | Sundaresan ............... | H04L 9/30 |
| 2019/0268342 A1 * | 8/2019 | Rossman ................ | G06F 21/40 |
| 2022/0255745 A1 * | 8/2022 | Tiffany ................... | G06F 21/31 |
| 2023/0092902 A1 * | 3/2023 | Jiang ..................... | H04L 9/3297 |
| | | | 705/64 |
| 2024/0080195 A1 * | 3/2024 | Schrum ................... | G06F 21/62 |
| 2024/0291658 A1 * | 8/2024 | O'Brien ................ | H04L 9/3239 |

* cited by examiner

*Primary Examiner* — J. Brant Murphy

(74) *Attorney, Agent, or Firm* — Kilpatrick Townsend & Stockton LLP; Michael A. Springs, Esq.

(57) ABSTRACT

A system can be used to prevent unauthorized resource access related to a compromised token. The system can generate a cancel request indicating that the compromised token has been compromised. The cancel request can include a time at which the compromised token was compromised. Additionally, the system can transmit the cancel request to a token management service to remove a related token associated with sensitive data corresponding to the compromised token. The related token can be generated subsequent to the time at which the compromised token was compromised. The system can determine that an unauthorized transfer operation was initiated using the compromised token or the related token. The system then can deny access to one or more protected resources by preventing an execution of the unauthorized transfer operation.

20 Claims, 3 Drawing Sheets

300

302
Generate a cancel request that a token has been compromised, the cancel request including a time at which the compromised token was compromised

304
Transmit the cancel request to a token management service to remove a related token that shares sensitive data of the compromised token

306
Control access to protected resources by denying access to the protected resources based on determining that an unauthorized transfer operation was initiated using the compromised token or the related token

300

| 302 |
| --- |
| Generate a cancel request that a token has been compromised, the cancel request including a time at which the compromised token was compromised |

| 304 |
| --- |
| Transmit the cancel request to a token management service to remove a related token that shares sensitive data of the compromised token |

| 306 |
| --- |
| Control access to protected resources by denying access to the protected resources based on determining that an unauthorized transfer operation was initiated using the compromised token or the related token |

*FIG. 3*

PREVENTING UNAUTHORIZED RESOURCE ACCESS RELATED TO A COMPROMISED TOKEN

TECHNICAL FIELD

The present disclosure relates generally to data security and, more particularly (although not necessarily exclusively), to preventing unauthorized resource access related to a compromised token.

BACKGROUND

A transfer operation can be initiated to transfer resources between entities. A physical token can provide identifying information corresponding to a particular entity to initiate and authorize the transfer operation. A virtual token can be generated and stored in a computing device to replace the physical token. The virtual token can substitute the identifying information of the physical token with a non-sensitive equivalent that can be used to initiate and authorize the transfer operation. The virtual token can be device-specific or application-specific such that a respective virtual token may be used to replace the physical token in different use cases.

SUMMARY

In some examples, a system includes a processor and a memory that includes instructions executable by the processor for causing the processor to perform operations. The operations can include generating a cancel request indicating that a token has been compromised. The cancel request can include a time at which the compromised token was compromised. The operations can include transmitting the cancel request to a token management service to remove a related token associated with sensitive data corresponding to the compromised token. The related token can be generated subsequent to the time at which the compromised token was compromised. Additionally, the operations can include determining that an unauthorized transfer operation was initiated using the compromised token or the related token. Further, the operations can include denying access to one or more protected resources by preventing an execution of the unauthorized transfer operation.

In some examples, a computer-implemented method can involve generating a cancel request indicating that a token has been compromised. The cancel request can include a time at which the compromised token was compromised. The computer-implemented method can involve transmitting the cancel request to a token management service to remove a related token associated with sensitive data corresponding to the compromised token. The related token can be generated subsequent to the time at which the compromised token was compromised. Additionally, the computer-implemented method can involve determining that an unauthorized transfer operation was initiated using the compromised token or the related token. Further, the computer-implemented method can involve denying access to one or more protected resources by preventing an execution of the unauthorized transfer operation.

In some examples, a non-transitory computer-readable medium can include program code executable by a processor for causing the processor to perform operations. The operations can include generating a cancel request indicating that a token has been compromised. The cancel request can include a time at which the compromised token was compromised. The operations can include transmitting the cancel request to a token management service to remove a related token associated with sensitive data corresponding to the compromised token. The related token can be generated subsequent to the time at which the compromised token was compromised. Additionally, the operations can include determining that an unauthorized transfer operation was initiated using the compromised token or the related token. Further, the operations can include denying access to one or more protected resources by preventing an execution of the unauthorized transfer operation.

BRIEF DESCRIPTION OF THE DRAWINGS

FIG. 3 is a flowchart of an example of a process to prevent unauthorized resource access related to a compromised token, according to some aspects of the present disclosure.

DETAILED DESCRIPTION

Figure 1:
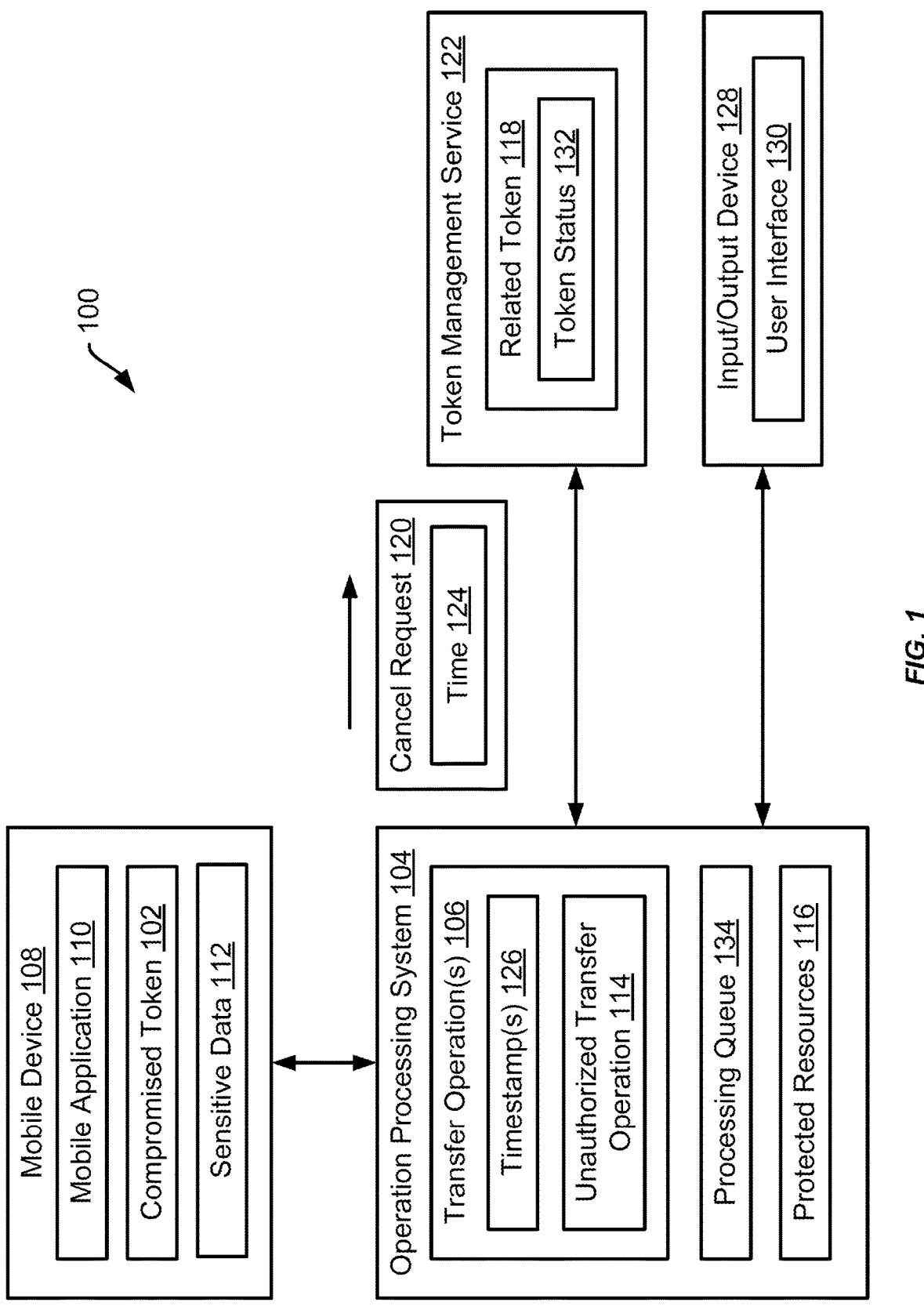
FIG. 1 is a block diagram of an example of a computing environment to prevent unauthorized resource access related to a compromised token, according to some aspects of the present disclosure.

Certain aspects and examples of the present disclosure relate to preventing unauthorized resource access related to a compromised token. An entity can initiate a transfer operation to provide or obtain access to one or more protected resources. Sensitive information associated with the entity that is used to initiate the transfer operation can be replaced with a non-sensitive equivalent to ensure data privacy or information security. The non-sensitive equivalent of the sensitive information can be referred to as a token. The token can function as a reference that can be used to map back to a sensitive data element through detokenization (e.g., a process of returning the token back into the original sensitive data element). A process of replacing the sensitive information with the token can be referred to as tokenization. Tokenization of the sensitive information can prevent a malicious actor from obtaining the sensitive information even if the transfer operation is intercepted or otherwise exposed to the malicious actor. But the malicious actor can compromise the token by gaining access to the token such that the malicious actor can use the compromised token to initiate unauthorized transfer operations. In some cases, the malicious actor can continue to use the compromised token to generate the unauthorized transfer operations even after the entity indicates that that the token has been compromised. Additionally, the malicious actor can use the compromised token to generate additional tokens that can also be used to initiate the unauthorized transfer operations. Executing the unauthorized transfer operations can result in unauthorized resource access affecting the entity associated with the compromised token.

Some examples described herein can address one or more of the abovementioned problems by implementing a system to prevent the unauthorized resource access associated with the compromised token. The system can generate a cancel request indicating that the compromised token has been compromised. The cancel request can include a time, a date, or a combination thereof at which the compromised token was lost or obtained by a malicious actor. The system can transmit the cancel request to a token management service that can manage a lifecycle of one or more tokens including the compromised token and one or more related tokens associated with the compromised token.

In some cases, the related tokens can correspond to the additional tokens generated by the malicious actor subsequent to obtaining access to the compromised token. Based on the cancel request, the token management service can remove or deactivate the compromised token and any related tokens generated by the malicious actor to prevent the malicious actor from continuing to initiate unauthorized transfer operations. In particular, the token management service can use the time indicated in the cancel request to determine which tokens to remove by adjusting a token status of the tokens. Accordingly, the system can enable the token management service to remove a subset of the related tokens created by the malicious actor while maintaining another subset of the related tokens created by the entity. Additionally, the system can restrict access to protected resources by preventing an execution of the unauthorized transfer operations initiated by the malicious actor using the compromised token or the related tokens, thereby providing increased data security.

As described herein, the system can execute a combination of steps in a non-conventional and non-generic way to prevent unauthorized transfer operations related to the compromised token from being executed, thereby overcoming technological problems specific to tokenization. For instance, certain aspects of the present disclosure provide a sequence of steps or events that resolve the technological problems associated with tokenization, such as the compromised token enabling a creation of related tokens for fraudulent activity. Examples of the present disclosure can ensure that the compromised token and any related tokens are deactivated in an automated process. Accordingly, the system of the present disclosure can provide secure access to the protected resources in a manner that is more than a routine or conventional token verification process.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing environment 100 to prevent unauthorized resource access related to a compromised token 102, according to some aspects of the present disclosure. As illustrated, the computing environment 100 can include an operation processing system 104 that can manage one or more transfer operations 106 initiated by an entity. In some examples, the entity may use a mobile device 108 communicatively coupled to the operation processing system 104 to initiate the transfer operations 106. The mobile device 108 can include a mobile application 110, such as a software application, that can be installed on the mobile device 108 to enable the entity to initiate the transfer operations 106 using the mobile device 108. In particular, the mobile device 108 can include a token 102 used to initiate the transfer operations 106 while replacing sensitive data 112 associated with the entity. Examples of the sensitive data 112 can include personal identifiable information, such as a name, password, identifying sequence of numbers or characters, physical address, virtual address, authentication code, etc. Although the token 102 is provided in FIG. 1 as a virtual token included the mobile device 108, it will be appreciated that the compromised token 102 can be a physical token, such as a credit card or a debit card.

In some examples, the token 102 can become compromised if a malicious actor obtains access to the token 102. As an example, the malicious actor can obtain the compromised token 102 by gaining access to an endpoint where the entity or a representation of the entity has already been authenticated. The representation of the entity can correspond to a virtual persona or an account associated with the entity. Using the access to the endpoint, the malicious actor can copy the compromised token 102 to a different endpoint controlled by the malicious actor. Accordingly, the malicious actor can use the compromised token 102 to generate an unauthorized transfer operation 114 that can be executed to access protected resources 116 associated with the entity. Examples of the protected resources 116 can include computing resources, such as storage, RAM, CPU cores, threads, etc. Additionally or alternatively, the protected resources 116 can include resources that can be provided in exchange for goods or services.

Additionally, such as in examples in which the compromised token 102 is a physical token, the malicious actor may use the compromised token 102 to generate at least one related token 118 associated with the compromised token 102. Similar to the compromised token 102, the related token 118 can replace the sensitive data 112 associated with the entity with respect to initiating the transfer operations 106. As an example, the malicious actor can use credential information provided via the physical token to initiate transfer operations 106 with multiple providers. As described herein, the providers can refer to entities that provide a good or a service. In some cases, the credential information can be printed or otherwise displayed on the physical token. A respective related token 118 can be generated with respect to each connection established by the malicious actor with a particular provider of the multiple providers. In other words, the related token 118 can be provider-specific such that each related token is associated with a different provider. Additionally or alternatively, the related token 118 may be device-specific. As an example, two different tokens may be used for a computing device and a mobile device.

To deactivate the related token 118, the operation processing system 104 can transmit a cancel request 120 to a token management service 122 communicatively coupled with the operation processing system 104. The cancel request 120 generated by the operation processing system 104 can include a time 124 at which the compromised token 102 was compromised. For instance, the time 124 can correspond to when the compromised token 102 was accessed, obtained, or used by the malicious actor. In some examples, the operation processing system 104 may flag the unauthorized transfer operation 114 due to suspicious activity that differs from one or more expected values. For instance, the operation processing system 104 can determine that the unauthorized transfer operation 114 was initiated using an Internet Protocol (IP) address that does not match any expected IP addresses associated with the entity. Consequently, in some examples, the operation processing system 104 may transmit a message to the mobile device 108 to verify the unauthorized transfer operation 114. If the unauthorized transfer operation 114 is unverified by the entity, the operation processing system 104 can categorize the unauthorized transfer operation 114 as fraudulent activity and proceed with deactivating the compromised token 102 and the related token 118.

The operation processing system 104 can detect that the unauthorized transfer operation 114 was initiated using the compromised token 102. In some cases, the operation processing system 104 can determine a timestamp 126 of when the unauthorized transfer operation 114 was initiated to identify the time 124 at which the compromised token 102 was compromised. The timestamp 126 can provide a date, time, or other suitable information to indicate when the unauthorized transfer operation 114 was initiated. In other cases, the operation processing system 104 can be communicatively coupled with an input/output (I/O) device 128 that can provide a user interface 130 for display. The user interface 130 can output one or more prompts to obtain information associated with the compromised token 102 from personnel of the operation processing system 104, from the entity associated with the compromised token, or a combination thereof. For instance, the user interface 130 may include one or more interface elements used to receive the information associated with the compromised token 102. Examples of the interface elements can include dropdown lists, text fields, date pickers, time pickers, or a combination thereof.

By interacting with the user interface 130, the personnel or the entity may provide user input to indicate a date or time when the compromised token 102 was compromised. For example, if the compromised token 102 is a physical token, the entity may provide user input indicating when the physical token was lost or left behind at a physical location. In some cases, an exact time or date of when the compromised token 102 was obtained by the malicious actor may be unclear or otherwise unavailable. Consequently, the personnel may provide an estimated value of when the compromised token 102 was accessed by the malicious actor based on one or more parameters, such as when the unauthorized transfer operation 114 was initiated, an access log indicating activity from the malicious actor, etc. Based on the estimated value inputted by the personnel, the operation processing system 104 can determine a time range within which the malicious actor likely obtained the compromised token 102.

In any case, using the time 124 provided in the cancel request 120, the token management service 122 can remove or deactivate the related token 118 that is managed by the token management service 122. In some examples, the token management service 122 can oversee a respective lifecycle of each token managed by the token management service 122. For example, the token management service 122 can manage the related token 118 from creation to deletion. Additionally, the token management service 122 may update each token based on changes associated with the entity or representations of the entity, such as a closure of an account causing a particular token to be removed.

Overseeing the lifecycle of the related token 118 can involve adjusting a token status 132 of the related token 118 based on the cancel request 120. For example, the token management service 122 can adjust the token status 132 to deactivate the related token 118, such as due to the related token 118 being used subsequent to the compromised token 102 being compromised. In particular, the token management service 122 can adjust the token status 132 from an active status to a deleted status to deactivate the related token 118. The deleted status can prevent the malicious actor from using the related token 118 to initiate additional transfer operations. The token management service 122 can similarly adjust another token status corresponding to the compromised token 102 to delete the compromised token 102 and prevent additional unauthorized transfer operations from being initiated by the malicious actor.

In some implementations, after adjusting the token status 132 of the related token 118 or the other token status of the compromised token 102, the operation processing system 104 may transmit a notification to the entity, such as via the mobile device. For example, the notification can indicate that the token status 132 of the related token 118 and the other token status of the compromised token 102 have been adjusted to deactivate the related token 118 and the compromised token 102, respectively. With respect to the compromised token 102, the notification may request that the entity provide updated credentials to replace the compromised token 102.

In some examples, the operation processing system 104 can deny the execution of the unauthorized transfer operation 114 based on the unauthorized transfer operation 114 being initiated using the compromised token 102 or the related token 118. For example, if the unauthorized transfer operation 114 is generated using the mobile device 108, the operation processing system 104 can receive the compromised token 102 along with the unauthorized transfer operation 114 to authenticate the unauthorized transfer operation 114. Accordingly, the operation processing system 104 can prevent the unauthorized transfer operation 114 from being performed. In some implementations, the operation processing system 104 may remove the unauthorized transfer operation 114 from a processing queue 134, thereby preventing the unauthorized transfer operation 114 from being executed. Additionally or alternatively, the operation processing system 104 may tag the unauthorized transfer operation 114, such as using metadata, to indicate that the unauthorized transfer operation 114 is fraudulent or otherwise unsuitable for execution.

Although FIG. 1 depicts a certain number and arrangement of components, this is for illustrative purposes and is intended to be non-limiting. Other examples may include more components, fewer components, different components, or a different arrangement of the components shown in FIG. 1. For example, the token management service 122 can manage multiple related tokens that are associated with the compromised token 102.

Figure 2:
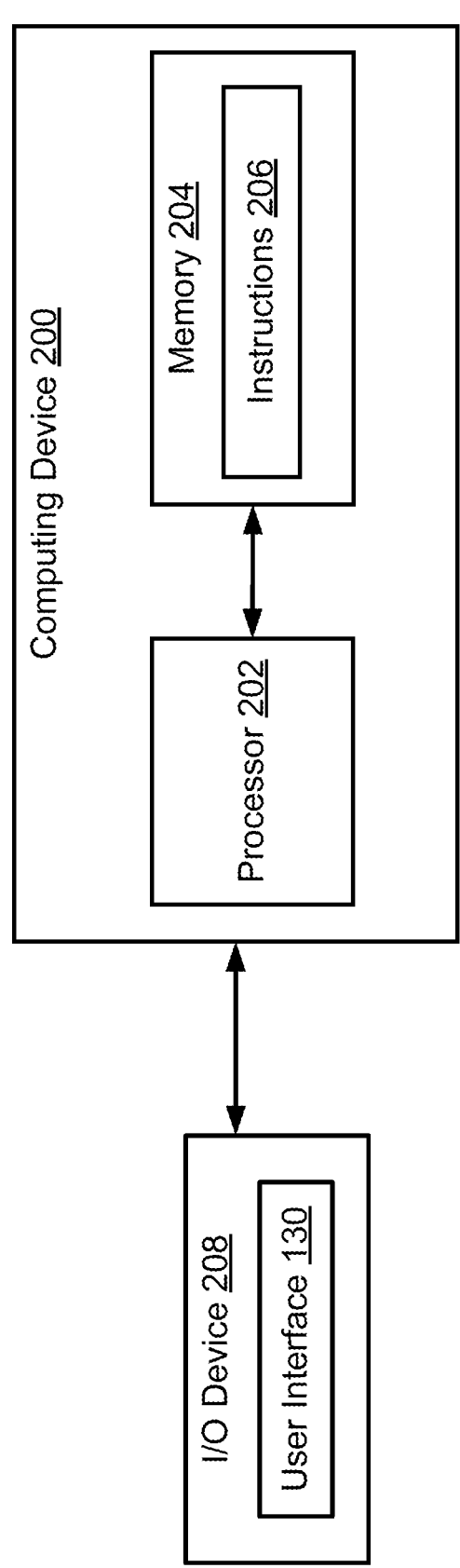
FIG. 2 is a block diagram of an example computing device to prevent unauthorized resource access related to a compromised token, according to some aspects of the present disclosure.

FIG. 2 is a block diagram of an example computing device 200 to prevent unauthorized resource access related to a compromised token 102, according to some aspects of the present disclosure. The computing device 200 includes a processor 202 that is communicatively coupled to a memory 204. In some examples, the processor 202 and the memory 204 may be distributed from (e.g., remote to) one another.

The processor 202 can include one processing device or multiple processing devices. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. In some examples, the instructions 206 can include processor-specific instructions generated by a compiler or an interpreter from code written in a suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory, computer-readable medium from which the processor 202 can read instructions 206. A computer-readable medium can include electronic, optical, magnetic, or other storage devices capable of providing the processor 202 with computer-readable instructions or other program codes. Non-limiting examples of a computer-readable medium include magnetic disk(s), memory chip(s), ROM, random-access memory (RAM), an ASIC, a configured processor, optical storage, or any other medium from which a computer processor can read the instructions 206.

The computing device 200 additionally may include or be communicatively coupled with one or more input/output (I/O) components, such an I/O device 208 that can output a user interface for display. In some cases, the I/O device 208 can correspond to the I/O device 128 of FIG. 1. Examples of the input components can include a mouse, a keyboard, a trackball, a touch pad, and a touch-screen display. Examples of the output components can include a visual display or an audio display. Examples of the visual display can include a liquid crystal display (LCD), a light-emitting diode (LED) display, or the touch-screen display. An example of the audio display can include speakers. In some cases, the I/O components can be integrated into a single structure with the components of the computing device 200. For example, the I/O components may be positioned within a single housing with the components of the computing device 200. In other examples, the I/O components can be distributed (e.g., in separate housings) and in electrical communication with each other and the computing device 200.

Turning now to FIG. 3, shown is a flowchart of an example of a process 300 to prevent unauthorized resource access related to a compromised token, according to some aspects of the present disclosure. Other examples can involve more operations, fewer operations, different operations, or a different order of operations shown in the figures. The operations of FIG. 3 will now be described below with reference to the components described above in FIGS. 1-2. Some or all of the steps of the process 300 can be performed by the processor 202.

At block 302, the processor 202 generates a cancel request 120 indicating that a token 102 has been compromised, such as due to being exposed to or accessed by a malicious actor. The cancel request 120 can include a time 124 at which the compromised token 102 was compromised or otherwise accessed by the malicious actor. For instance, the time 124 can correspond to when a data breach occurred, enabling the malicious actor to obtain the compromised token 102. In some examples, the processor 202 can detect that the compromised token 102 has been compromised based on fraudulent activity flagged by the processor 202 with respect to an entity associated with the compromised token 102. Additionally, the processor 202 can determine the time 124 to include in the cancel request 120 based on when the fraudulent activity occurred.

At block 304, the processor 202 transmits the cancel request 120 to a token management service 122 to remove a related token 118 associated with sensitive data 112 corresponding to the compromised token 102. The related token 118 can be generated subsequent to the time 124 at which the compromised token 102 was compromised. For example, the related token 118 may be created by the malicious actor using the compromised token 102, such as by entering credential information displayed on a physical token into a webpage or a software application to initiate a subscription service. As another example, the malicious actor may use the compromised token 102 to generate the related token 118 by adding the credential information from the compromised token 102 into a mobile wallet. The mobile wallet can be used by the malicious actor to implement a contactless initiation of an unauthorized transfer operation 114.

Based on the time 124 included in the cancel request 120, the token management service 122 can be executed to adjust a respective token status corresponding to each token associated with the entity that is generated after the time 124. For example, the token management service 122 can determine, using a creation log storing a creation time of the related token 118, that the related token 118 was generated on March 10$^{th}$. If the time 124 provided in the cancel request 120 indicates that the malicious actor accessed the compromised token 102 on March 1$^{st}$, the token management service 122 can delete the related token 118 due to the related token 118 being generated after March 1$^{st}$. In some cases, the token management service 122 may request confirmation from the entity that the related token 118 is fraudulent or otherwise unauthorized by the entity before deactivating the related token 118.

At block 306, the processor 202 controls access to protected resources 116 by denying access to the protected resources 116 based on determining that the unauthorized transfer operation 114 was initiated using the compromised token 102 or the related token 118. For example, the processor 202 may determine that unauthorized transfer operation 114 was initiated using the compromised token 102 using metadata included in a transfer request received by the processor 202 to initiate the unauthorized transfer operation 114. As another example, the processor 202 can determine that the unauthorized transfer operation 114 was initiated using the related token 118 based on when the related token 118 was last used and when the unauthorized transfer operation 114 was initiated. The processor 202 can request a response from the token management service 122 to determine when the related token 118 was last used to initiate a transfer operation. If the last time that the related token 118 was used matches when the unauthorized transfer operation 114 was initiated, the processor 202 may determine that the unauthorized transfer operation 114 was initiated using the related token 118.

After determining that the unauthorized transfer operation 114 was initiated using the compromised token 102 or the related token 118, the processor 202 can deny access to the protected resources 116. In particular, the processor 202 may deny access to the protected resources 116 by preventing an execution of the unauthorized transfer operation 114. For example, the processor 202 can prevent the execution of the unauthorized transfer operation 114 by removing the unauthorized transfer operation 114 from a processing queue 134 used to execute transfer operations 106. In some examples, a subset of the transfer operations 106 that includes the unauthorized transfer operation 114 can be removed from the processing queue 134. For example, the processor 202 may filter a list of transfer operations 106 scheduled to be executed in the processing queue 134 to determine a subset of the transfer operations 106 that is associated with the compromised token 102 or the related token 118.

In one example, the processor 202 can determine that the compromised token 102 has been compromised based on determining that the compromised token 102 has been used to initiate an unauthorized transfer operation 114. For instance, the processor 202 may receive an indication provided by an entity interacting with a user interface of a mobile application 110 installed on a mobile device 108 associated with the entity. The indication can indicate that the token 102 has been compromised based on the compromised token 102 being used to initiate a recurring transfer operation, such as a subscription or a recurring deposit, that mirrors an existing transfer operation initiated by the entity. In other words, a malicious actor may attempt to conceal the unauthorized transfer operation 114 by altering the unauthorized transfer operation 114 to be similar to the existing transfer operation that has been previously authorized by the entity. Once the processor 202 determines that the token 102 has been compromised, the processor 202 can generate a cancel request 120 that indicates that the token 102 has been compromised. The processor 202 then can transmit the cancel request 120 using an application programming interface (API) to the token management service 122 to request a removal of the related token 118, the compromised token 102, or a combination thereof. Additionally, the cancel request 120 can cause the token management service 122 to deactivate the related token 118 overseen by the token management service 122 based on when the related token 118 was last used. In particular, the cancel request 120 can include an indication that the token 102 was accessed by the malicious actor at the time 124 that the unauthorized transfer operation 114 was initiated. Based on the time 124 provided in the cancel request 120 and when the related token 118 was last used, the token management service 122 can deactivate the related token 118 using its authorization to manage a lifecycle of the tokens. In particular, the authorization of the token management service 122 can enable the token management service 122 to adjust the token status 132 of the related token 118 from an active status to a deleted status, thereby deactivating the related token 118. In addition to ensuring a deactivation of the related token 118, the processor 202 can control access to protected resources 116 by denying the execution of the unauthorized transfer operation 114 based on determining that the unauthorized transfer operation 114 was initiated used the compromised token 102. The processor 202 can determine that a particular time at which the compromised token 102 was last used matches a creation time associated with the unauthorized transfer operation 114. After confirming that the unauthorized transfer operation 114 lacks validation, the processor 202 can deny the execution of the unauthorized transfer operation 114 by removing the unauthorized transfer operation 114 from a batch process. The batch process can function as a processing queue that includes multiple transfer operations scheduled to be executed at a particular time.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

a processor; and a memory including instructions that are executable by the processor for causing the processor to perform operations comprising:

generating a cancel request indicating that a token has been compromised, the cancel request including a time at which the compromised token was compromised;

transmitting the cancel request to a token management service to remove a related token associated with sensitive data corresponding to the compromised token, the related token being generated subsequent to the time at which the compromised token was compromised;

determining that an unauthorized transfer operation was initiated using the compromised token or the related token; and denying access to one or more protected resources by preventing an execution of the unauthorized transfer operation.

2. The system of claim 1, wherein the token management service is configured to remove the related token by adjusting, based on the cancel request, a token status corresponding to the related token.

3. The system of claim 1, wherein preventing the execution of the unauthorized transfer operation comprises:

determining that the unauthorized transfer operation is unauthorized based on the unauthorized transfer operation being initiated using the compromised token or the related token; and subsequent to determining that the unauthorized transfer operation was initiated using the compromised token or the related token, removing the unauthorized transfer operation from a processing queue to prevent the unauthorized transfer operation from being executed.

4. The system of claim 1, wherein the operations further comprise, prior to transmitting the cancel request to the token management service:

detecting that the unauthorized transfer operation was initiated using the compromised token;

in response to detecting that the unauthorized transfer operation has been initiated, identifying a timestamp of the unauthorized transfer operation; and generating the cancel request, wherein the cancel request includes the timestamp of the unauthorized transfer operation as the time at which the compromised token was compromised.

5. The system of claim 1, wherein the operations further comprise:

outputting a user interface for display to an entity, wherein the user interface is configured to receive user input from the entity that indicates the time at which the token was compromised; and in response to receiving the user input at the user interface, generating the cancel request to remove the related token generated subsequent to the time included in the cancel request.

6. The system of claim 1, wherein the time at which the token was compromised is provided to the token management service as a time range based on an estimated value.

7. The system of claim 1, wherein the compromised token is a virtual token associated with a software application installed on a mobile device to initiate one or more transfer operations using the mobile device.

8. A computer-implemented method comprising:

generating a cancel request indicating that a token has been compromised, the cancel request including a time at which the compromised token was compromised;

transmitting the cancel request to a token management service to remove a related token associated with sensitive data corresponding to the compromised token, the related token being generated subsequent to the time at which the compromised token was compromised;

determining that an unauthorized transfer operation was initiated using the compromised token or the related token; and denying access to one or more protected resources by preventing an execution of the unauthorized transfer operation.

9. The computer-implemented method of claim 8, wherein the token management service is configured to remove the related token by adjusting, based on the cancel request, a token status corresponding to the related token.

10. The computer-implemented method of claim 8, wherein denying the execution of the unauthorized transfer operation comprises:

determining that the unauthorized transfer operation is unauthorized based on the unauthorized transfer operation being initiated using the compromised token or the related token; and subsequent to determining that the unauthorized transfer operation was initiated using the compromised token or the related token, removing the unauthorized transfer operation from a processing queue to prevent the unauthorized transfer operation from being executed.

11. The computer-implemented method of claim 8, further comprising, prior to transmitting the cancel request to the token management service:

detecting that the unauthorized transfer operation was initiated using the compromised token;

in response to detecting that the unauthorized transfer operation has been initiated, identifying a timestamp of the unauthorized transfer operation; and generating the cancel request, wherein the cancel request includes the timestamp of the unauthorized transfer operation as the time at which the compromised token was compromised.

12. The computer-implemented method of claim 8, further comprising:

outputting a user interface for display to an entity, wherein the user interface is configured to receive user input from the entity that indicates the time at which the token was compromised; and in response to receiving the user input at the user interface, generating the cancel request to remove the related token generated subsequent to the time included in the cancel request.

13. The computer-implemented method of claim 8, wherein the time at which the token was compromised is provided to the token management service as a time range based on an estimated value.

14. The computer-implemented method of claim 8, wherein the compromised token is a virtual token associated with a software application installed on a mobile device to initiate one or more transfer operations using the mobile device.

15. A non-transitory computer-readable medium comprising program code executable by a processor for causing the processor to perform operations comprising:

generating a cancel request indicating that a token has been compromised, the cancel request including a time at which the compromised token was compromised;

transmitting the cancel request to a token management service to remove a related token associated with sensitive data corresponding to the compromised token, the related token being generated subsequent to the time at which the compromised token was compromised;

determining that an unauthorized transfer operation was initiated using the compromised token or the related token; and denying access to one or more protected resources by preventing an execution of the unauthorized transfer operation.

16. The non-transitory computer-readable medium of claim 15, wherein the token management service is configured to remove the related token by adjusting, based on the cancel request, a token status corresponding to the related token.

17. The non-transitory computer-readable medium of claim 15, wherein denying the execution of the unauthorized transfer operation comprises:

determining that the unauthorized transfer operation is unauthorized based on the unauthorized transfer operation being initiated using the compromised token or the related token; and subsequent to determining that the unauthorized transfer operation was initiated using the compromised token or the related token, removing the unauthorized transfer operation from a processing queue to prevent the unauthorized transfer operation from being executed.

18. The non-transitory computer-readable medium of claim 15, wherein the operations further comprise, prior to transmitting the cancel request to the token management service:

detecting that the unauthorized transfer operation was initiated using the compromised token;

in response to detecting that the unauthorized transfer operation has been initiated, identifying a timestamp of the unauthorized transfer operation; and generating the cancel request, wherein the cancel request includes the timestamp of the unauthorized transfer operation as the time at which the compromised token was compromised.

19. The non-transitory computer-readable medium of claim 15, wherein the operations further comprise:

outputting a user interface for display to an entity, wherein the user interface is configured to receive user input from the entity that indicates the time at which the token was compromised; and in response to receiving the user input at the user interface, generating the cancel request to remove the related token generated subsequent to the time included in the cancel request.

20. The non-transitory computer-readable medium of claim 15, wherein the time at which the token was compromised is provided to the token management service as a time range based on an estimated value.

* * * * *